(12) United States Patent
Liu et al.

(10) Patent No.: US 11,836,469 B2
(45) Date of Patent: Dec. 5, 2023

(54) DYNAMIC CODE SNIPPET PROMOTION

(71) Applicant: International Business Machines Corporation, Armonk, NY (US)

(72) Inventors: Bo Tong Liu, Beijing (CN); Li Cao, Beijing (CN); Qi Li, Beijing (CN); Jin Sheng Gao, Beijing (CN); Yan Wei Zhao, Beijing (CN); Jun Long Xiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 17/337,602

(22) Filed: Jun. 3, 2021

(65) Prior Publication Data
US 2022/0391180 A1    Dec. 8, 2022

(51) Int. Cl.
*G06F 8/36* (2018.01)
*G06F 40/40* (2020.01)
*G06F 16/2457* (2019.01)

(52) U.S. Cl.
CPC .......... *G06F 8/36* (2013.01); *G06F 16/24578* (2019.01); *G06F 40/40* (2020.01)

(58) Field of Classification Search
None
See application file for complete search history.

(56) References Cited

U.S. PATENT DOCUMENTS

| | | | |
|---|---|---|---|
| 8,412,653 B2 | 4/2013 | Marfatia et al. | |
| 8,688,676 B2 | 4/2014 | Rush et al. | |
| 10,809,984 B2* | 10/2020 | Mizrahi | G06F 40/242 |
| 11,500,619 B1* | 11/2022 | Abdelaziz | G06F 8/33 |
| 2007/0168946 A1* | 7/2007 | Drissi | G06F 8/36 717/110 |
| 2014/0013299 A1 | 1/2014 | Bordeaux et al. | |
| 2015/0378692 A1* | 12/2015 | Dang | G06F 8/36 717/106 |
| 2017/0060540 A1* | 3/2017 | Allen | G06F 8/36 |
| 2017/0060555 A1* | 3/2017 | Allen | G06F 8/34 |

(Continued)

FOREIGN PATENT DOCUMENTS

| | | |
|---|---|---|
| CN | 102664875 B | 12/2014 |
| CN | 102902700 B | 2/2015 |
| CN | 106462399 B | 10/2019 |

OTHER PUBLICATIONS

Drosos et al., "Wrex: A Unified Programming-by-Example Interaction for Synthesizing Readable Code for Data Scientists," ACM, 2020, 12pg. (Year: 2020).*

(Continued)

*Primary Examiner* — Ryan D. Coyer
(74) *Attorney, Agent, or Firm* — Teddi Maranzano; Cantor Colburn LLP

(57) ABSTRACT

Aspects include determining a coding intention and a dimension of interest to a user. A plurality of relevant projects that each include a logical code block that meets the coding intention are located. The locating includes searching a plurality of code repositories based at least in part on the coding intention. A score is assigned to each of the plurality of logical code blocks based at least in part on properties associated with the logical code blocks and on the dimension of interest to the user. A logical code block with the highest score is promoted to the user.

18 Claims, 15 Drawing Sheets

(56) References Cited

U.S. PATENT DOCUMENTS

| | | | |
|---|---|---|---|
| 2018/0027082 A1* | 1/2018 | Choudhary | G06Q 30/0256 |
| | | | 709/224 |
| 2020/0117446 A1* | 4/2020 | Smith | G06F 9/4451 |
| 2020/0167134 A1* | 5/2020 | Dey | G06F 8/65 |
| 2020/0293291 A1 | 9/2020 | Guan | |
| 2021/0011696 A1 | 1/2021 | Makkar et al. | |
| 2021/0081182 A1* | 3/2021 | Seshadri | G06F 8/73 |
| 2022/0107802 A1* | 4/2022 | Rao | G06F 16/907 |

OTHER PUBLICATIONS

Lin et al., "Learning to Mine Aligned Code and Natural Language Pairs from Stack Overflow," ACM, 2018, 11pg. (Year: 2018).*

Disclosed Anonymously; "Comment Based Programming", IP.com No. IPCOM000255897D; Publication Date: Oct. 19, 2018, 10 pages.

Peter Mell et al., "The NIST Definition of Cloud Computing", NIST, Special Publication 800-145, 7 pages.

\* cited by examiner

FIG. 2

DYNAMIC CODE SNIPPET PROMOTION

BACKGROUND

The present invention relates generally to computer processing, and more specifically, to dynamic code snipped promotion.

There are a vast number of programming languages and software development frameworks that are currently used to build and implement computer software applications. When application developers initiate a new software project or code a new portion of an existing software project, they often look to one or more code repositories for examples of existing computer code that performs the desired function(s) or similar function(s). The ability to access and use examples of working computer code as templates when developing new computer systems can save time in the application development, testing, and maintenance processes.

SUMMARY

Embodiments of the present invention are directed to dynamic code snippet promotion. A non-limiting example computer-implemented method includes determining, by a processor, a coding intention and a dimension of interest to a user. A plurality of relevant projects that each include a logical code block that meets the coding intention are located by the processor. The locating includes searching a plurality of code repositories based at least in part on the coding intention. A score is assigned, by the processor, to each of the plurality of logical code blocks based at least in part on properties associated with the logical code blocks and on the dimension of interest to the user. A logical code block with the highest score is promoted, by the processor, to the user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts an illustration of a user interface that includes results of searching repositories for a code snippet according to one or more embodiments of the present invention;

Figure 1:
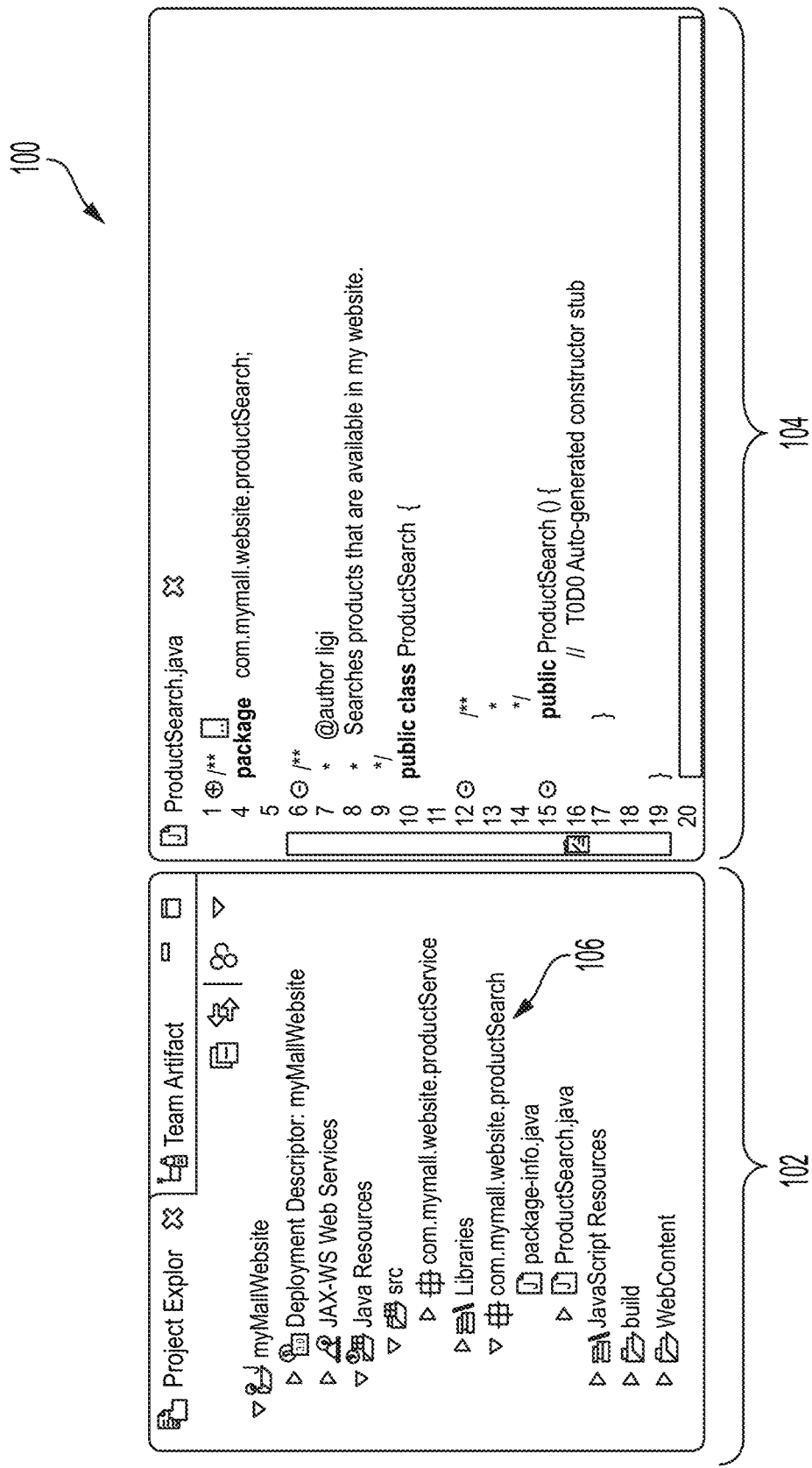
FIG. 1 depicts an illustration of a user interface of an integrated development environment (IDE) according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention are directed to dynamically locating and evaluating code snippets for use by computer programmers when they are generating new software code. When computer programmers are tasked with creating code for implementing a new function for a software project, it is often helpful for them to look for examples of computer code that have already been written to perform the desired function. This can involve scanning through the descriptions and contents of a large number of software programs in an attempt to locate a code snippet that best fits the function and the environment being implemented by the computer programmer. When performed manually this code snippet locating process can be both painstaking and inefficient. Due to the time consuming nature of manually searching for code snippets, the search by the computer programmer is limited to a small subset of the tens of thousands of code repositories that are available for searching. In addition, even when a matching code snippet is found, the quality of the code snippet and the ease of integrating it into the new software project may both be difficult to ascertain.

One or more embodiments of the present invention provide automated dynamic code snippet promotion of code snippets located in one or more code repositories. By automating the search and analysis, one or more embodiments of the present invention provide the ability to search a greater number of code repositories and to consider a greater number of code snippets in a consistent manner when compared with contemporary techniques which are largely manual. The code snippets from the various code repositories that are promoted, or suggested to the user, include code snippets with high scores in terms of matching the user intention, or desired functionality/platform, as well as having high scores in user specified dimensions (e.g., stability, security, etc.). In accordance with one or more embodiments of the present invention, additional code snippets are suggested to the user based on contents of the software projects where the promoted code snippets were located.

In accordance with one or more embodiments of the present invention, the user intention, or coding intention, is generated using natural language processing (NLP) analysis of user input and user project context analysis. The resources in a code platform that provides access to multiple searchable code repositories are divided into different categories and sub-categories in a hierarchical manner. The code snippets are evaluated, and the relevant code snippets are predicted based on coding intention, or user intention. Eventually the best fit code snippet is promoted (e.g., suggested to the user). One or more embodiments of the present invention make it possible to locate the best code snippet reference by mapping the high scoring code snippets with the user intention. When a GitHub platform is used, the scoring can include, for example, the number of watches, stars, or forks for the project containing the code snippet. One or more embodiments of the present invention not only help users to get the most relevant code snippet reference from the potentially tens of thousands of projects in a code platform, but they also provide users with a highly rated code snippet.

One or more embodiments of the present invention analyze the coding intention of the user via NLP analysis and perform user project context analysis to generate search terms that are used to search one or more code repositories. The relevant projects that are returned from the search are divided up into logical code blocks based on resource analysis. The code in the logical code blocks are evaluated by focusing on the user interested dimension(s) and the coding intention(s) of the user. Logical code blocks, also referred to herein as code snippets, are suggested to the user based on correlation and similarity of distribution.

As used herein, the terms "repository" and "code repository" are used interchangeably to refer to a central location (e.g., a database or other storage mechanism) for storing software code (e.g., source code, object code) and optionally storing information related to the software code (e.g., a README file).

As used herein, the term "project" refers to a collection of computer programs and any associated documentation. A project may be broken up into multiple sub-projects each focusing on a specified high-level function and/or a specified phase (e.g., designing, coding, testing, maintenance) of software development. The code in a sub-project may be broken up into several parts each focusing on implementing a particular function within the high-level function, and there are often dependences between the different parts.

As used herein, the terms "code snippet" and "logical code block" are used interchangeably to refer to a portion of re-usable source code or machine code that can be incorporated into larger programming modules. In accordance with one or more embodiments of the present invention, a code snippet can be made up of one or more parts, or code blocks, including a selected part and other parts that the selected part is dependent on for executing.

Examples described herein use GitHub as an example of a code hosting platform that provides access to multiple searchable repositories. In a GitHub environment, a single repository is used to organize a single project. A repository can include any items related to a software development project such as, but not limited to code files, text files, image files, and project plans. Embodiments are not limited to GitHub, as any platform that provides access to a searchable code repository can be utilized such as, but not limited to GitHub, Bitbucket, and/or Assembla.

As used herein, the term "dimension" refers to a quality of a code snippet that is important to the user. Examples of dimensions include, but are not limited to stability, popularity, reusability, security, correlation, and scalability. A user may specify one or more dimensions of interest and/or the system may infer one or more dimensions of interest based on background knowledge such as software project documentation.

As used herein, the terms "coding intention" or "user intention" are used interchangeably to refer to keywords that describe the desired functionality and coding environment of the code snippet that the user is trying to locate. Functionality refers to one or more functions performed by the code snippet, and environment refers to characteristics of the computing environment where the code snippet will be executed such as, but not limited to, operating system, type of databases, networks, and/or hardware.

Turning now to FIG. 1, an illustration of a user interface 100 in an integrated development environment (IDE) is generally shown in accordance with one or more embodiments of the present invention. The left side 102 of FIG. 1 depicts elements, or resources, of a software development project called "myMallWebsite." The elements include a code module labeled "com.mymall.website.productSearch" 106 which is implemented in Java. Contents of the element labeled "com.mymall.website.productSearch" 106 are shown on the right side 104 of FIG. 1. The function of the code module to implement "com.mymall.website.productSearch" is described in FIG. 1 as "Searches products that are available in my website." In accordance with one or more embodiments of the present invention, instead of developing the software code to perform this function from scratch, a software developer may want to search repositories containing existing software code to locate a code snippet that performs this function or a similar function to use as a template.

Figure 2:
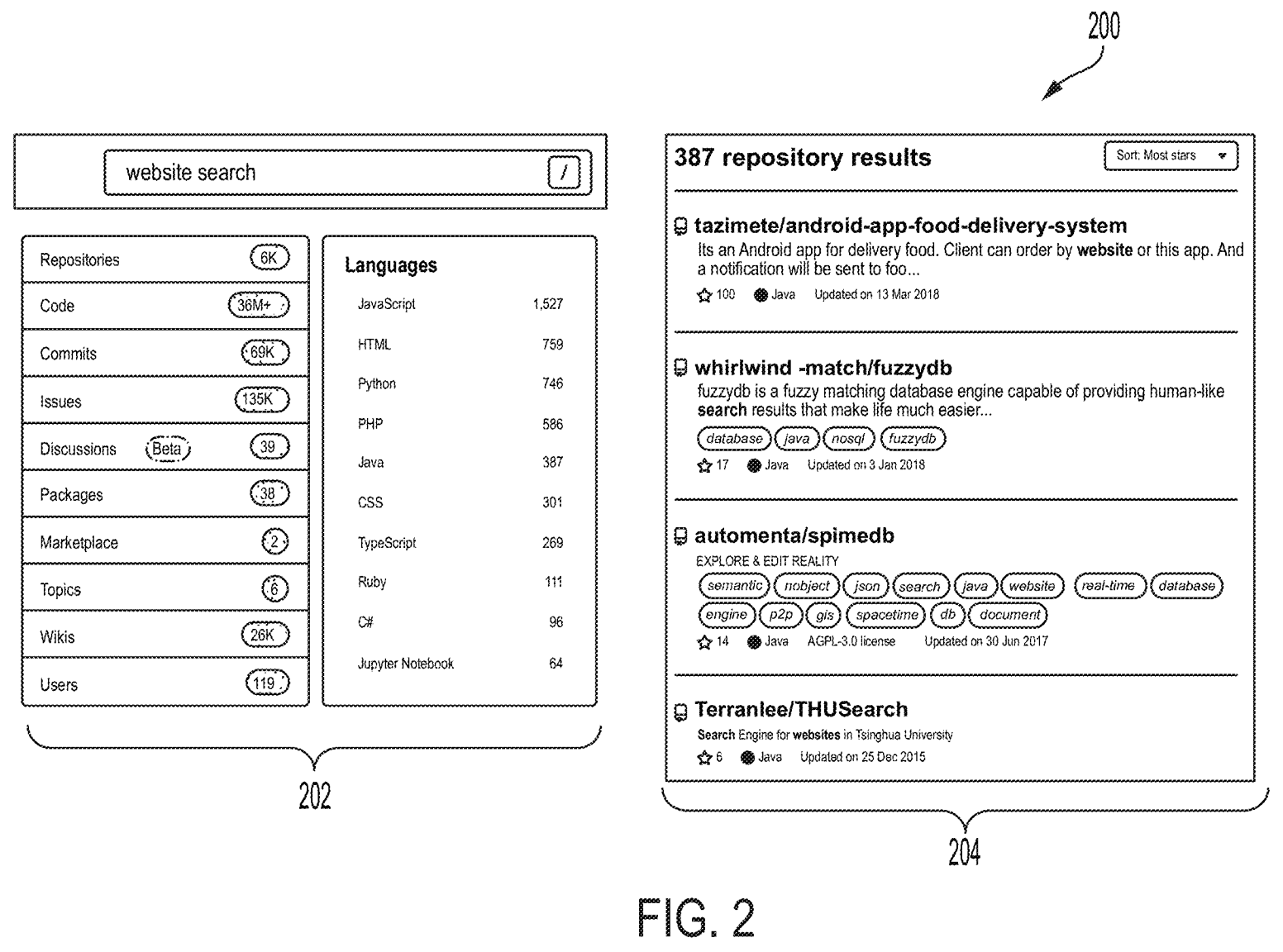

Turning now to FIG. 2, an illustration of a user interface 200 that includes results of searching repositories for a code snippet is generally shown in accordance with one or more embodiments of the present invention. In accordance with one or more embodiments of the present invention, the user uses a tool such as, but not limited to, GitHub to perform the search. As shown in FIG. 2, the repositories were searched using the search terms "website search" which were input by the software developer. A summary of the search results 202 indicates that six-thousand repositories were searched and that three-hundred and eighty-seven of the repository results (e.g., projects) are written in Java. The repository results 204 written in Java are shown in FIG. 2 as being sorted from projects with the most stars (e.g., an indicator of interest or use by other people) to least stars. Current methods include a software developer looking at the results 204 one by one to find the project(s) that appear to be a best match for the user's software development project. For example, the result with the most stars in FIG. 2 is an Android application which may not be a platform that is compliant with the user's software development project. Once a matching project is found, the user cannot be sure of the quality of the software code in the matching project, or about how easy (or difficult) it will be to find and insert a specific code snippet of the software code into the user's software development project.

Other contemporary methods of selecting and incorporating code snippets from existing software projects include moving preselected code snippets for a user to choose from into an IDE. The code snippets in the IDE can be pre-qualified in terms of code quality and ease of incorporation into a software program. Benefits to this approach include the ability to have pre-qualified code snippets, while downsides include the limited number of code snippets that will be available.

One or more embodiments of the present invention address one or more of the shortcomings of contemporary approaches for locating and evaluating candidate code snippets by providing dynamic code snippet promotion. One or more embodiments of the present invention automate the process of locating the highest quality snippet for the user intention. One or more embodiments of the present invention also promote predicted relevant code snippets based on the user intention. One or more embodiments of the present invention can scan through a large number (thousands, tens of thousands) of software projects to locate code snippets and to predict (and promote) other code snippets of interest to the user. One or more embodiments of the present invention can be utilized as a supplement to code snippets that have been preselected and stored in an IDE. One or more embodiments of the present invention reduce time and effort for application developers to find code snippets that are high quality and that match the user intentions.

Figure 3:
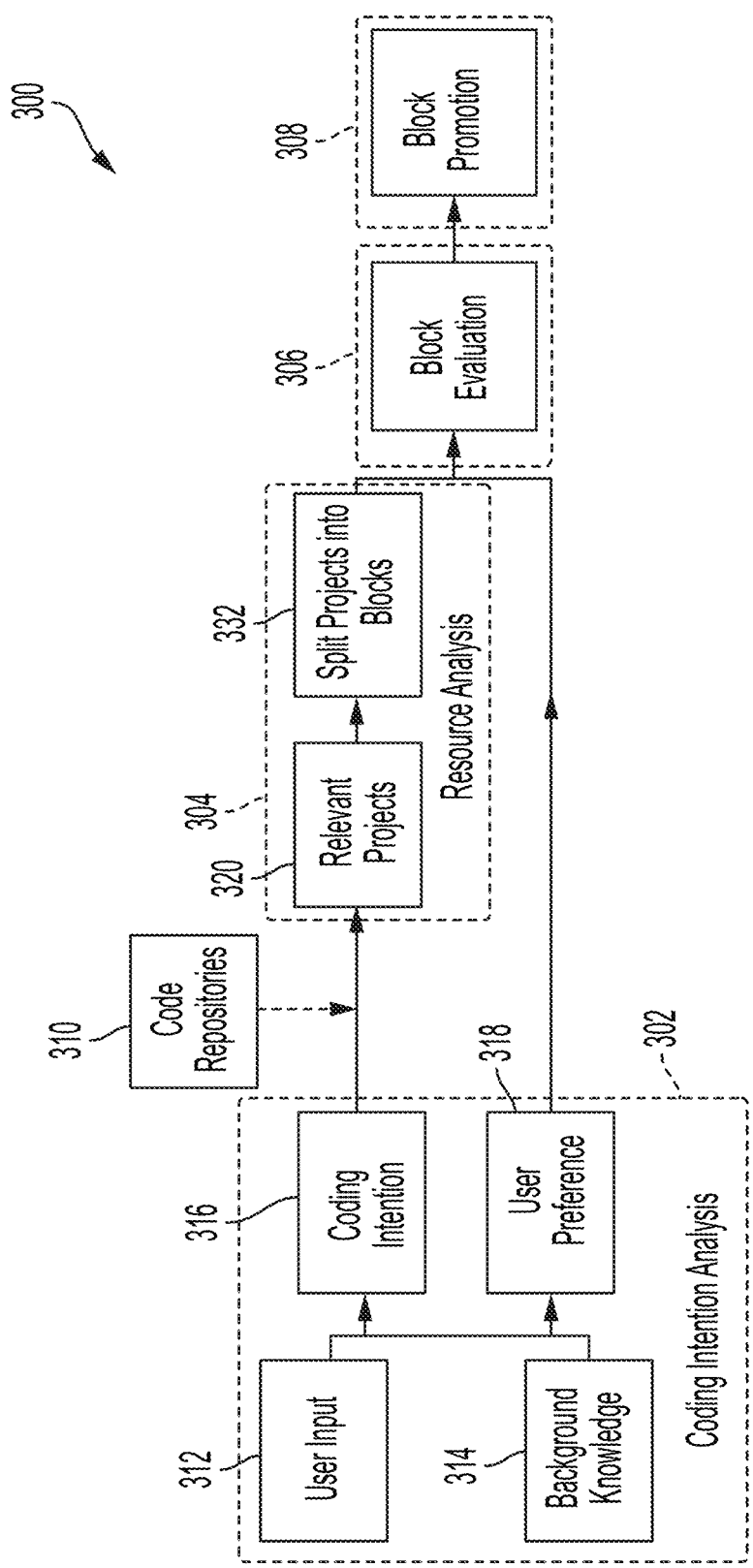
FIG. 3 depicts a block diagram of a method for performing dynamic code snippet promotion according to one or more embodiments of the present invention.

Turning now to FIG. 3, a block diagram 300 of a system for performing dynamic code snippet promotion is generally shown in accordance with one or more embodiments of the present invention. The block diagram 300 shown in FIG. 3 includes a coding intention analysis module 302, a resource analysis module 304, a block evaluation module 306, a block promotion module 308, and code repositories 310. All or a portion of the processing described in reference to the block diagram of FIG. 3 can be performed, for example, by computer system 1500 of FIG. 15 and/or by one or more of the cloud computing nodes 10 and/or cloud computing devices 54A-N of FIG. 13. The code repositories 310 can be located in any one or more storage mediums known in the art and can be accessed locally and/or via one or more networks. In one or more embodiments of the present invention, one or more of the code repositories 310 are located on computer system 1500 of FIG. 15 and/or on one or more of the cloud computing nodes 10 and/or computing devices 54A-N of FIG. 13.

The coding intention analysis module 302 shown in FIG. 3 includes user input 312 and background knowledge 314 which are input to a coding intention module 316 and a user preference module 318. The user input 312 can include, but is not limited to, a description of the functionality of the code snippet that the user is searching for, a name of the resource in the IDE that describes the code snippet (e.g., in the example in FIG. 1 "com.mymall.website.productSearch" 106), and comments in the source code (e.g., in the example in FIG. 1 "Searches products that are available in my website."). The background knowledge 314, or project context, can include, but is not limited to, documentation about the current software project such as that found in a code repository or IDE of the current software project or a related software project (s), documentation about the coding practices or standards followed by the team implementing the current software project, the hardware and software requirements of the current project, the programming language and/or coding style of the current project.

In accordance with one or more embodiments of the present invention, the coding intention module 316 generates a set of search keywords, based on NLP analysis of the user input 312 and the background knowledge 314, or project context, and the generated search keywords are input to the resource analysis module 304. In accordance with one or more embodiments of the present invention, the keywords generated based on the user input 312 and the background knowledge 314, or "original intention" keywords, can be supplemented or replaced with "hidden intention" keywords that are extracted from a knowledge tree that is constructed based on contents of one more of the code repositories 310.

The user preferences module 318 in the coding intention analysis module 302 generates user preferences based, for example, on user input 312 such as dimensions that are important to the user and/or information that is extracted (e.g., using NLP) from the background knowledge 314. As shown in the embodiment of FIG. 3, the user preferences generated by the user preferences module 318 are input to the block evaluation module 306. An example of processing performed by the coding intention analysis module 302 is described below in reference to FIG. 4 and FIG. 5.

Still referring to FIG. 3, in accordance with one or more embodiments of the present invention, the resource analysis module 304 extracts relevant projects from the code repositories 310 by searching contents of the code repositories 310 using the keywords generated by the coding intention module 316. The computer code for the extracted projects can be separated into logical code blocks based on dependencies between the code blocks. In accordance with one or more embodiments of the present invention, the extracting of relevant projects is performed by the relevant projects module 320 searching the code repositories 310. The code repositories 310 may include multiple (tens, hundreds, thousands, tens of thousands, etc.) code repositories 310 each including computer code blocks and/or documentation about one or more completed or in process software projects. In accordance with one or more embodiments of the present invention, a project is extracted from the code repositories 310 when at least one of its parts, or code blocks, includes content that matches the keywords generated by the coding intention module 316. Additionally, or alternatively projects can be selected based on contents of other elements of the project (e.g., a README file or other documentation about the project).

In accordance with one or more embodiments of the present invention, an additional search of the code repositories 310 may be performed based on contents of a knowledge tree structure that is created based on the current software project that the user is locating a code snippet for and/or based on one or more of the projects extracted using the key words. Contents of the knowledge tree can be used to locate additional search terms, or a "hidden coding intention", for use in an additional search to supplement the previously generated search terms (the original coding intention). The building of the knowledge tree and performing the additional search can be performed in response to not locating an exact match to the keywords during a search of the code repositories 310. Alternatively, the locating of the hidden coding intention using knowledge tree can be performed prior to searching the code repositories 310 to refine the keywords that are used to perform the searching.

The split projects into blocks module 322 of the resource analysis module 304 of FIG. 3 creates logical code blocks that include the matching (e.g., includes one or more of the search terms) code block and other code blocks that the matching code block depends on to perform its intended function. One or more logical code blocks can be created for each project that is extracted from the code repositories 310. An example of processing performed by the resource analysis module 304 is described below in reference to FIG. 6 and FIG. 7.

The block evaluation module 306 shown in FIG. 3 evaluates and calculates scores for the logical code blocks created by the split projects into blocks module 322 based at least in part on the user preferences received from the user preference module 318. Examples of user preferences can include user dimensions, coding languages, design methodology, and/or hardware platform. In accordance with one or more embodiments of the present invention, the score of each logical block is calculated using a formula that considers both logical code block properties and user interested dimensions. An example of processing performed by the block evaluation module 308 is described below in reference to FIG. 8.

The block promotion module 308 of FIG. 3 promotes, or suggests to the user (e.g., via a user interface), the logical code block with the highest score. In one or more embodiments of the present a plurality of logical code blocks from one or more projects are promoted to the user in order of calculated score from highest to lowest. After promoting the logical code block with the highest score, other logical code blocks in the project that are included in the highest scoring block and logical code blocks in a selected number of other projects that also had high scoring code blocks are evaluated to promote, or suggest, additional code blocks to the user. These promoted code blocks may perform functions that are related to the functionality requested by the user. In accordance with one or more embodiments of the present invention, the key features of each of the candidate, or available, logical code blocks are extracted and the candidate logical code blocks are clustered using a clustering algorithm such as, but not limited to density-based spatial clustering of applications with noise (DBSCAN). In accordance with one or more embodiments of the present invention, the cluster is sorted by the average score of the logical code blocks in each cluster, and the cluster with the highest score is selected. The logical code blocks in the selected cluster are sorted and the logical code block with the highest score is selected and promoted to the user, via a user interface, as a relevant block. An example of processing performed by the block promotion module 308 is described below in reference to FIG. 9, FIG. 10, and FIG. 11.

The processing described in reference to FIG. 3 is not intended to indicate that the operations are to be executed in any particular order, or that all of the operations shown in FIG. 3 are to be included in every case. Additionally, the processing shown in FIG. 3 can include any suitable number of additional modules for performing additional operations. Further, the modules shown in FIG. 3 can be arranged differently.

Figure 4:
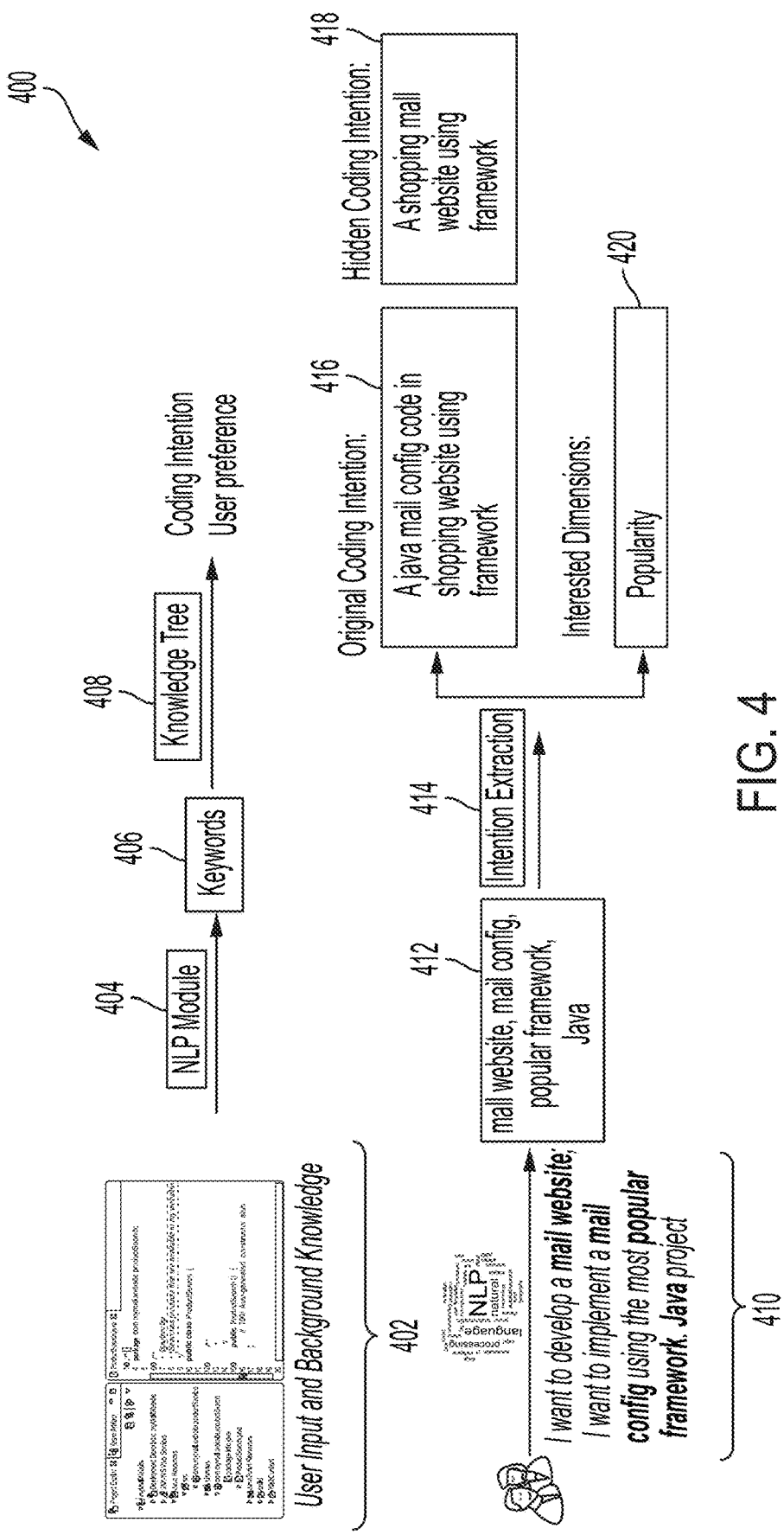
FIG. 4 depicts a block diagram of determining a coding intention and a user preference according to one or more embodiments of the present invention.

Turning now to FIG. 4, a block diagram 400 of determining a coding intention(s) and a user preference(s) is generally shown in accordance with one or more embodiments of the present invention. All or a portion of the processing shown in FIG. 4 can be performed by the coding intention analysis module 302 of FIG. 3. As shown in FIG. 4, user input and background knowledge 402, such as user input 312 of FIG. 3 and background knowledge 314 of FIG. 3, are input to a NLP module 404 which generates keywords 406 that indicate a coding intention(s) and a user preference(s) for the target code snippet to be located. In the embodiment shown in FIG. 4, a knowledge tree 408 is constructed and used to refine the keywords 406 generated by the NLP module 404.

In accordance with one or more embodiments of the present invention, the knowledge tree 408 is generated based on contents of one or more code repositories, such as code repositories 310 of FIG. 2. The knowledge tree 408 can be utilized to refine the NLP generated keywords 406 that describe the coding intention(s) and the user preference(s). In accordance with one or more embodiments of the present invention, the knowledge tree is generated based on contents of all or a subset of the code repositories 310. The subset of the code repositories 310 to be included in the knowledge can be selected based on documentation in the repositories that describe the projects (e.g., design documents, title, README file, etc.) and the keywords 406 generated by the NLP module 404.

As shown in the example in FIG. 4, user input and background knowledge 410 that includes "I want to develop a mall website; I want to implement a mail config using the most popular framework. Java project" is received by an NLP module which extracts keywords 412 based on the user input 410. The extracted keywords 412 shown in FIG. 4 include "mall website, mail config, popular framework, Java." In accordance with the embodiment shown in FIG. 4, the intention extraction 414 includes creating a knowledge tree, such as knowledge tree 500 in FIG. 5, based on one or more repositories which can be selected, for example, based on the keywords 412. In accordance with one or more embodiments of the present invention, the knowledge tree 408 is built from existing resources such as GitHub and the knowledge tree 408 is similar to an enhanced classification tree. Each node of the knowledge tree 408 contains attributes, which can be used to search.

An example of building a knowledge tree 408 that can be utilized by one or more embodiments of the present invention follows. First, for all of the existing projects, some key features can be selected (e.g., manually or automatically). Examples of key features include, but are not limited to: the language of the project and the application field, which can be used to classify the projects into different categories such as "Java→NLP project" and "Java→Java Web project". Next, based on the tags and attributes of each project, an existing clustering algorithm (e.g., DSCAN) can be used to classify the projects under each category. For example, under the "Java→Java Web project" category, a subset of the projects may be similar because they are in the same application field (e.g., shopping mall websites), and they are categorized as belonging to the same cluster (e.g., "shopping mall website" cluster). Next, based on locating some projects that are in the same cluster, and based on the tags and the descriptions of the projects, functions provided in most of the projects within the same cluster are identified (e.g., login module, mail configuration, product search, etc.). The resulting structure is the knowledge tree 408.

In accordance with one or more embodiments of the present invention, the knowledge tree 408 is traversed to locate leaves and/or branches having descriptions that are similar to the extracted keywords 412. The intention extraction module 414 shown in FIG. 4, implemented for example by coding intention module 316 of FIG. 3, uses NLP to generate an original coding intention 416 that includes "A java mail config code in shopping website using framework", a hidden coding intention 418 that includes "A shopping mall website using framework", and an interested dimensions 420 that includes "popularity."

Figure 5:
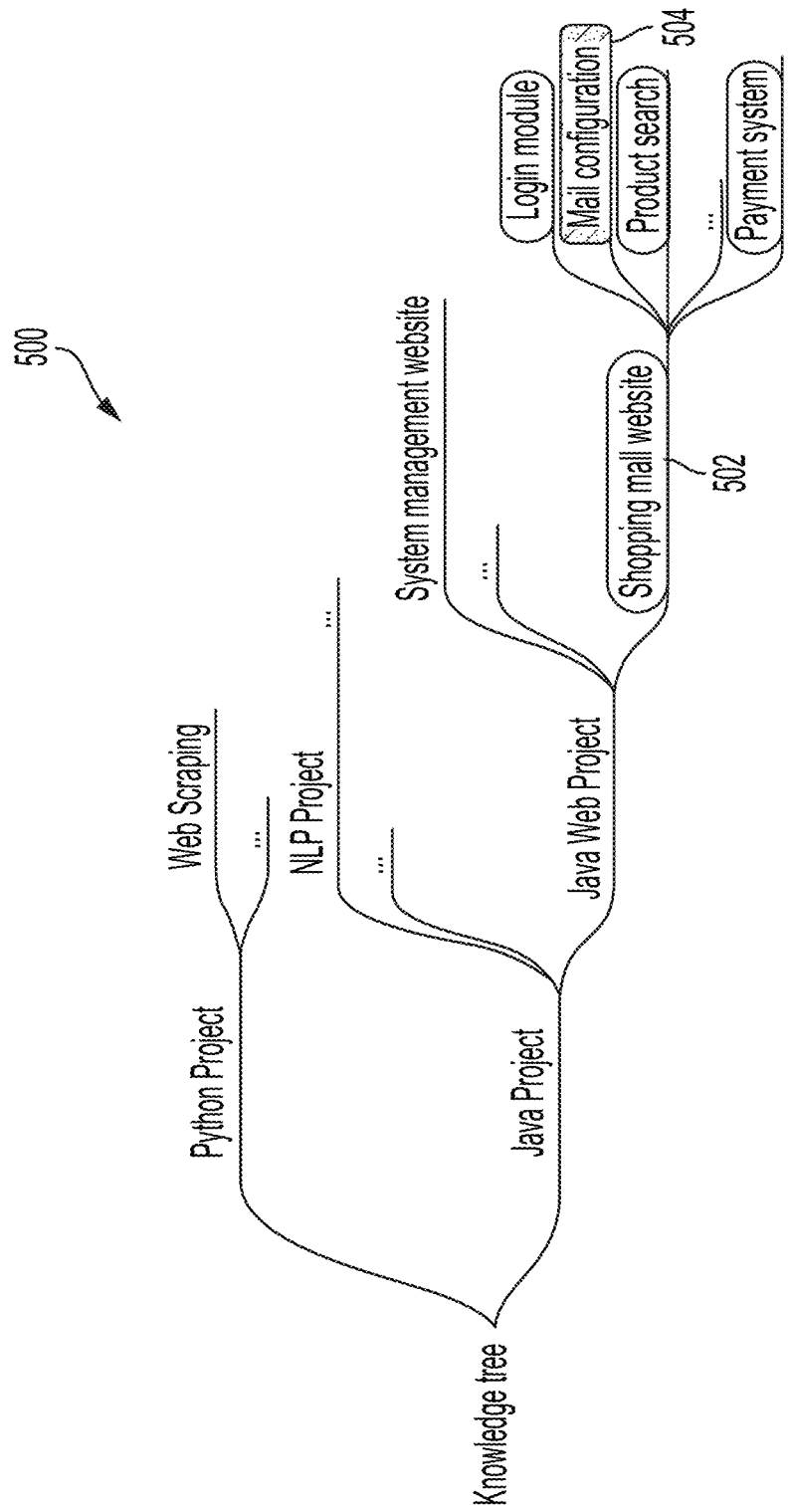
FIG. 5 depicts a block diagram of a knowledge tree according to one or more embodiments of the present invention.

Turning now to FIG. 5, an example of a knowledge tree 500 is generally shown in accordance with one or more embodiments of the present invention. In accordance with one or more embodiments of the present invention, the knowledge tree 500 is searched using the keywords 422 "mall website, mail config, popular framework, Java." The leaf 504 with the terms "mail configuration" is returned as matching the keywords 422. In this example, leaf 504 is not an exact match but it is the closest match (e.g., the match result that is closest to the original intention). Using the keywords, "Java, mall website, mail config" and the attributes of the tree nodes, the matching leaf in the knowledge tree is located. One or more embodiments of the present invention traverse the tree from leaf 504 to the previous branch 502 which is labeled with the terms "Shopping mall website." This is used to generate a hidden coding intention 418 and the additional keywords "shopping mall website." The original coding intention 416 is generated from the extracted keywords 412.

In accordance with one or more embodiments of the present invention, in the example shown in FIG. 4 and FIG. 5, the extracted keywords 412 are "mall website, mail config, popular framework, Java", and the original coding intention 416 is "mall website, mail config, framework, Java." The hidden coding intention 418 is generated from the extracted keywords 412 and the knowledge tree 500. From the keywords "mail config", it can be determined that the user may want to search for the function "mail configuration", however because the function "mail configuration" is under the cluster "Shopping mall website" in the knowledge tree 500, it can be determined that the user may not only want to search the function "mail configuration" but also may want to search how to implement a "Shopping mall website" which is referred to herein as the hidden coding intention 418.

Figure 6:
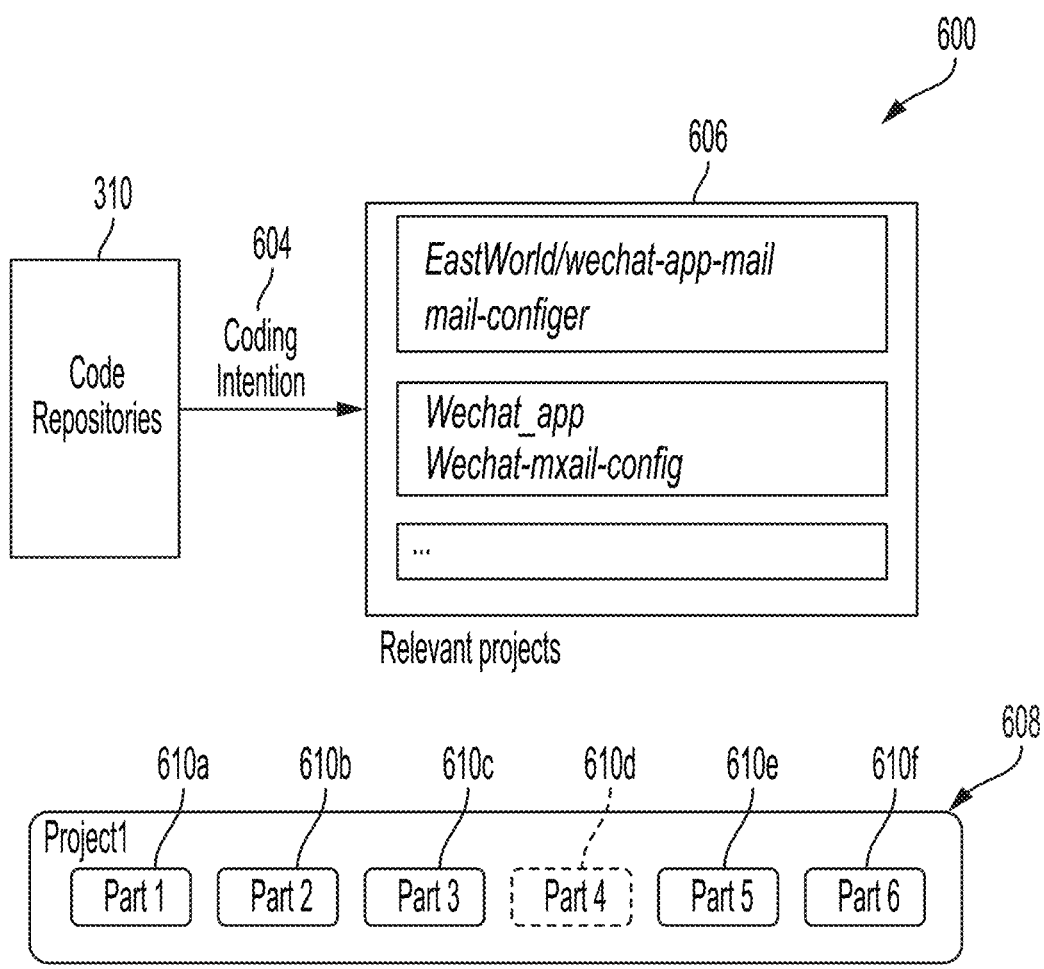
FIG. 6 depicts a block diagram of performing resource analysis according to one or more embodiments of the present invention.
Figure 7:
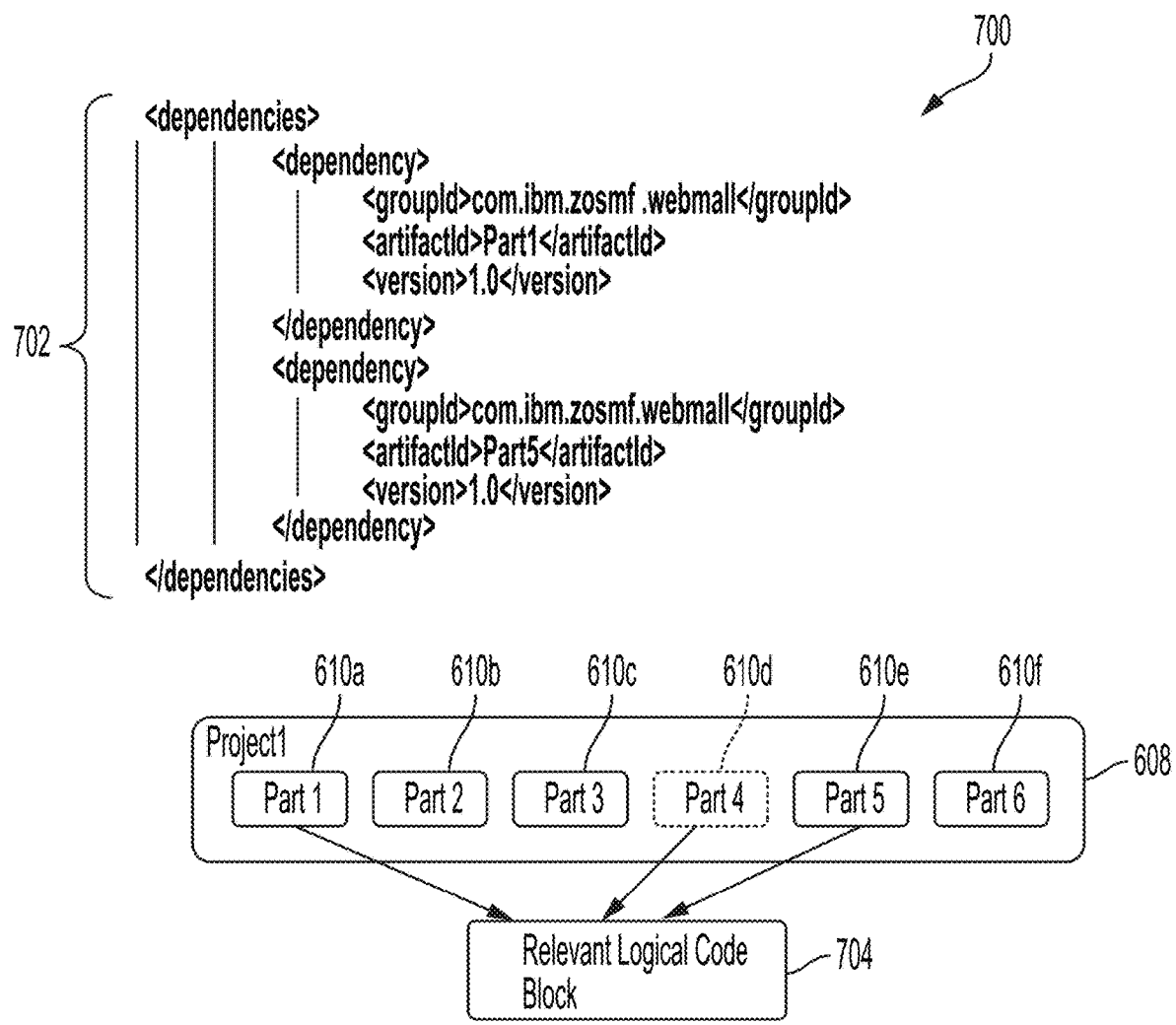
FIG. 7 depicts a block diagram of performing resource analysis according to one or more embodiments of the present invention.

Turning now to FIG. 6 and FIG. 7, block diagrams of performing resource analysis are generally shown in accordance with one or more embodiments of the present invention. All or a portion of the processing described in reference to FIG. 6 and FIG. 7 can be performed, for example by the resource analysis module 304 of FIG. 3. As shown in the block diagram 600 of FIG. 6, one or more relevant projects 606 are extracted from the code repositories by searching the keywords 604 generated by the coding intention analysis module 302. In accordance with one or more embodiments of the present invention, the search is done through the existing search engine of a code platform such as Github. The matching projects are the most relevant results returned by the search engine of the code platform. As described previously, the keywords reflect an original intention and possibly also a hidden intention of the user. A project generally includes multiple code packages and each code package is treated as a part. Project 1 608 shown in FIG. 6 includes Part 1 610a, Part 2 610b, Part 3 610c, Part 4 610d, Part 5 6103, and Part 6 610f, referred to collectively as parts 610.

In a typical software project, one part often depends on other parts and in accordance with one or more embodiments of the present invention, a part and all of the parts that it depends on are treated as a logical code block, or code snippet. The dependencies between the parts 610 can be defined in the configuration file of the project 608 or they can be extracted from the project 608. For example, if the project 608 is a Java project built by Maven, the xml file 702 shown in the block diagram 700 of FIG. 7 defines the parts 610 and part dependencies. In the example shown in FIG. 7, Part 4 610d is the relevant code of interest that meets the user intention (the target code block). As shown in the xml file 702, Part 4 610d is dependent on Part 1 610a and Part 5 610e. Part 1 610a, Part 4 610d, and Part 5 610e are combined to generate relevant logical code block 704.

In accordance with one or more embodiments of the present invention relevant logical code blocks 704 that include the relevant code of interest, or target code block, are generated for each of the relevant projects 606.

Figure 8:
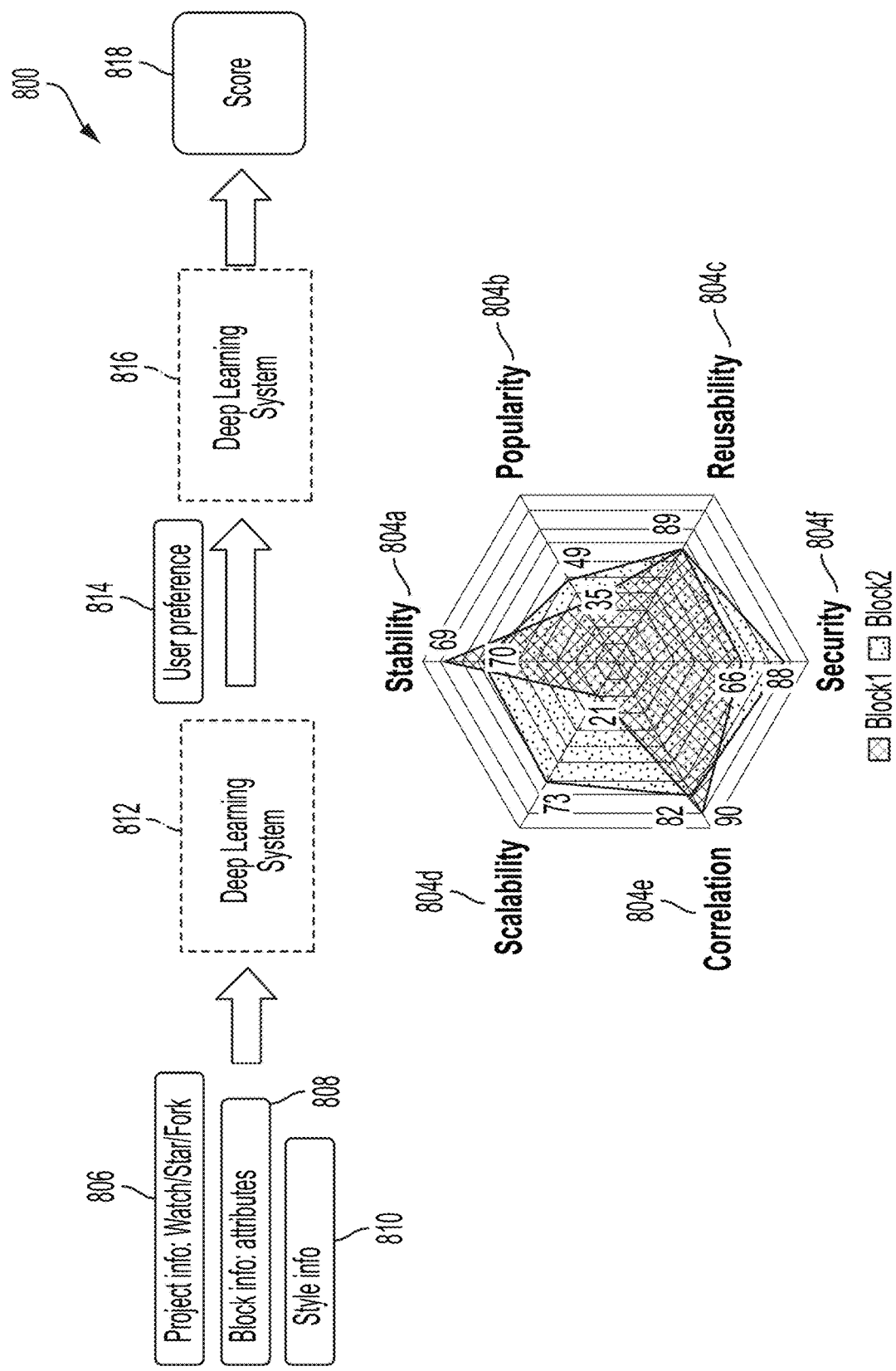
FIG. 8 depicts a block diagram of performing code evaluation according to one or more embodiments of the present invention.

Turning now to FIG. 8 a block diagram 800 of performing code evaluation is generally shown in accordance with one or more embodiments of the present invention. All or a portion of the processing described in reference to FIG. 8 can be performed, for example by blocks evaluation module 306 of FIG. 3. As shown in FIG. 8, a score is calculated for each of the logical blocks using information about the block and the user preferences, generated for example by user preference module 318 of FIG. 3. Examples of information about, or properties of, the logical code block can include, but are not limited to project information 806, block information 808, and style information 810. When a GitHub platform is utilized the project information 806 can include watch, star, and fork measurement associated with the project. These measurements represent the visibility and the popularity of the project. In general, the greater the values, the higher the perceived quality of the project. In accordance with one or more embodiments of the present invention, the values of watch, star, and fork are summed.

The block information 808 can include, but is not limited to, attributes such as the number of references by other projects, timestamp of latest commit (e.g., when was it last updated), number of contributors, names of contributors, and number of reported issues. The style information 810 can include similarity of the coding style of the logical code block and the style of the user project.

As shown in FIG. 8, the project information 806, block information 808, and style information 810 are input to deep learning system 812. In accordance with one or more embodiments of the present invention, the deep learning engine 812 calculates dimension scores based on this input. As shown in the embodiment in FIG. 8, deep learning system 812 generates a score for each logical code block that is mapped to different user interest dimensions. For example, the popularity score 804b can be calculated using the formula:

$$xN\downarrow\text{fork} + yN\downarrow\text{star} + zN\downarrow\text{watch} + \ldots$$

In the above formula, "x" is the assigned weight (specified by the user or derived by the system or a system default value) reflecting the importance of the fork measurement to the user, "y" is the assigned weight reflecting the importance of the star measurement to the user, and "z" is the assigned weight reflecting the importance of the watch measurement to the user. $N\downarrow$ fork is the number of forks, $N\downarrow$ star is the number of stars, and $N\downarrow$ watch is the number of watches.

Additional criteria related to the block information and style information can also be included in calculating the scores 804 For example, block information such as, but not limited to number of references by other projects contributes to the popularity dimension, and the style information contributes to the correlation dimension.

In accordance with one more embodiments of the present invention, a stability score 804a, a popularity score 804b, a reusability score 804c, a scalability score 804d, a correlation score 804e, and a security score 804f, referred to herein collectively as scores 804 are calculated by deep learning system 812 for each of the dimensions. As shown in FIG. 8, Block 1 has a stability score 804a of 69, a popularity score 804b of 35, a reusability score 804c of 89, a scalability score 804d of 21, a correlation score 804e of 90, and a security score 804f of 66. Also as shown in FIG. 8, Block 2 has a stability score 804a of 70, a popularity score 804b of 49, a reusability score 804c of 89, a scalability score 804d of 88, a correlation score 804e of 82, and a security score 804f of 88.

The output from deep learning system 812 and the user preferences, generated for example, by user preference module 318, are input to deep learning system 816 to calculate a final score 818 for each of the logical code blocks. In accordance with one or more embodiments of the present invention the final score 818 for reach block is calculated using the formula:

$$a \cdot S \downarrow \text{popularity} + bS \downarrow \text{stability} + cS \downarrow \text{scalability} + \ldots$$

In the above formula, "a" is the assigned weight (specified by the user or derived by the system or a system default value) reflecting the importance of the popularity dimension to the user, "b" is the assigned weight reflecting the importance of the stability dimension to the user, and "c" is the assigned weight reflecting the importance of the scalability measurement to the user. $S \downarrow$ popularity is the calculated score of the popularity (e.g., popularity score 804b), $S \downarrow$ stability is the score of the stability, and $S \downarrow$ scalability is the score of the scalability. In this manner, the final score 818 takes into account the dimension(s) that are important to the user.

In accordance with one or more embodiments of the present invention, the logical code block with the highest final score 818 is promoted, or suggested, to the user. In accordance with one or more embodiments of the present invention a specified number (e.g., two, three, five, ten, etc.) of the top scoring logical code blocks are promoted to the user along with their scores.

Figure 9:
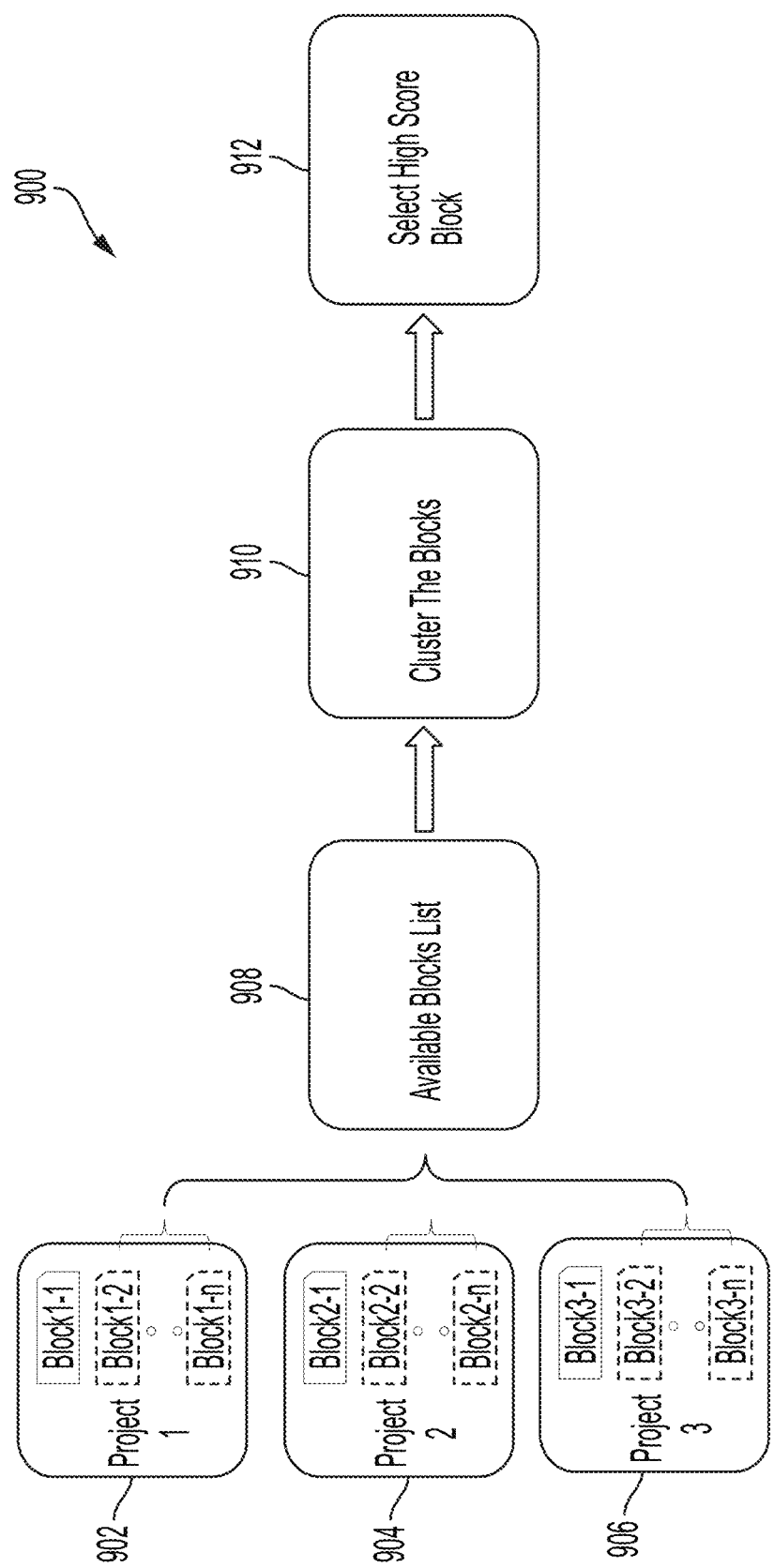
FIG. 9 depicts a block diagram of performing code block promotion according to one or more embodiments of the present invention.
Figure 10:
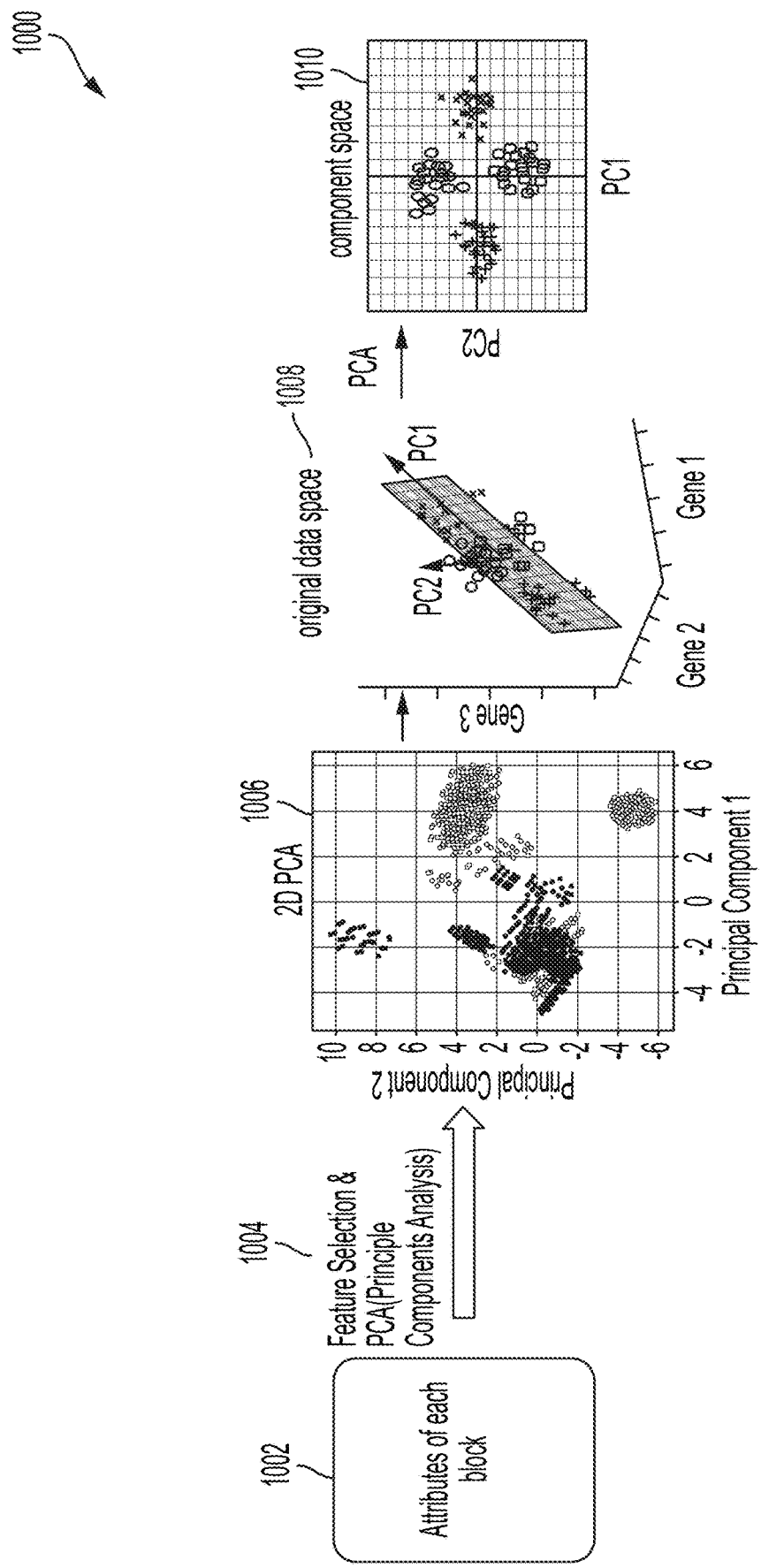
FIG. 10 depicts a block diagram of performing code block promotion according to one or more embodiments of the present invention.
Figure 11:
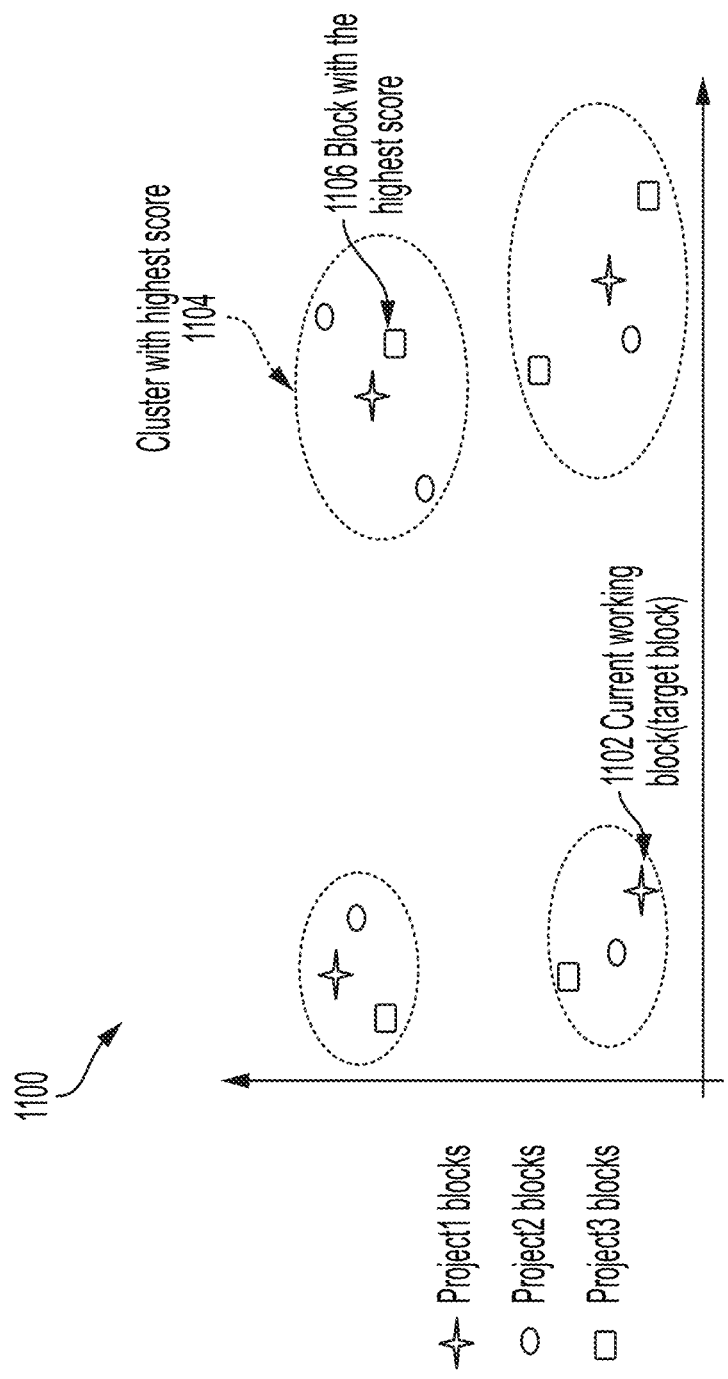
FIG. 11 depicts a block diagram of performing code block promotion according to one or more embodiments of the present invention.

Turning now to FIG. 9, FIG. 10, and FIG. 11, block diagrams of performing code block promotion are generally shown in accordance with one or more embodiments of the present invention. All or a portion of the processing described in reference to FIG. 9, FIG. 10, and FIG. 11 can be performed, for example by the blocks promotion module 308 of FIG. 3. After promoting the logical coding block with the highest score in the user interested dimension(s), a subsequent set of logical code blocks are analyzed as shown in the block diagram 900 of FIG. 9 to promote additional blocks that may be relevant to the user. FIG. 9 depicts Project 1 902 which contains the highest scoring logical code block, Project 2 904 which contains the second highest scoring logical code block, and Project 3 906 which includes the third highest scoring logical code block. Each of these projects may include other logical code blocks which are added to an available blocks list 908 which may be useful for the user project. As shown in FIG. 9, Project 1 902 includes logical code blocks labeled "Block1-1 . . . Block 1-n", Project 2 904 includes logical code blocks labeled "Block2-1 . . . Block 2-n", and Project 3 906 includes logical code blocks labeled "Block3-1 . . . Block 3-n."

At block 910, the logical code blocks in the available blocks list 910 are clustered so that logical code blocks that perform the same function are in the same cluster, and at block 912 a block in each cluster with the highest score is selected for promotion to the user. The block diagram 1000 of FIG. 10 shows an embodiment of how the clustering can be performed. As shown in FIG. 10 at block 1002 attributes of each block, such as block information 808 of FIG. 8, are extracted and used to perform feature selection and principle components analysis (PCA) 1004 to select the important features, or attributes. In accordance with one or more embodiments of the present invention, the features of a logical code block have different weights. For example, as described in the formula above that calculates popularity score 804b, fork, star and watch are the features which have different assigned weights. The feature selection can drop the low weight features and keep the high weight features. Blocks 1006, 1008, 1010 use principal component analysis (PCA) to identify correlations between data points. Block 1006 shows an example of blocks with 2 features, block 1008 shows an example of blocks with 3 features and block 1010 shows an example of blocks with multiple features.

Turning now to FIG. 11, a block diagram 1100 of an example of the available blocks from Project 1 902, Project 2 904, and Project 3 906 divided into four clusters is generally shown in accordance with one or more embodiments of the present invention. The logical code blocks within each circle in the block diagram 1100 of FIG. 11 perform the same, or a very similar function. The current working block 1102 is the logical code block that was previously promoted to the user to perform in response to the user request. As shown in FIG. 11, a logical code block in the cluster with the highest score 1104 is selected for promotion to the user. The cluster with the highest score 1104 is the cluster that has functionality that is determined to be the most relevant or closest to the functionality provided by the current working block 1102. The logical code block with the highest score 1106 in the cluster with the highest score 1104 is promoted the user. In accordance with one or more embodiments of the present invention additional logical code blocks can be promoted to the user from other clusters and/or new clusters can be performed based on whether or not the user selected the promoted code block for use in the user project.

Figure 12:
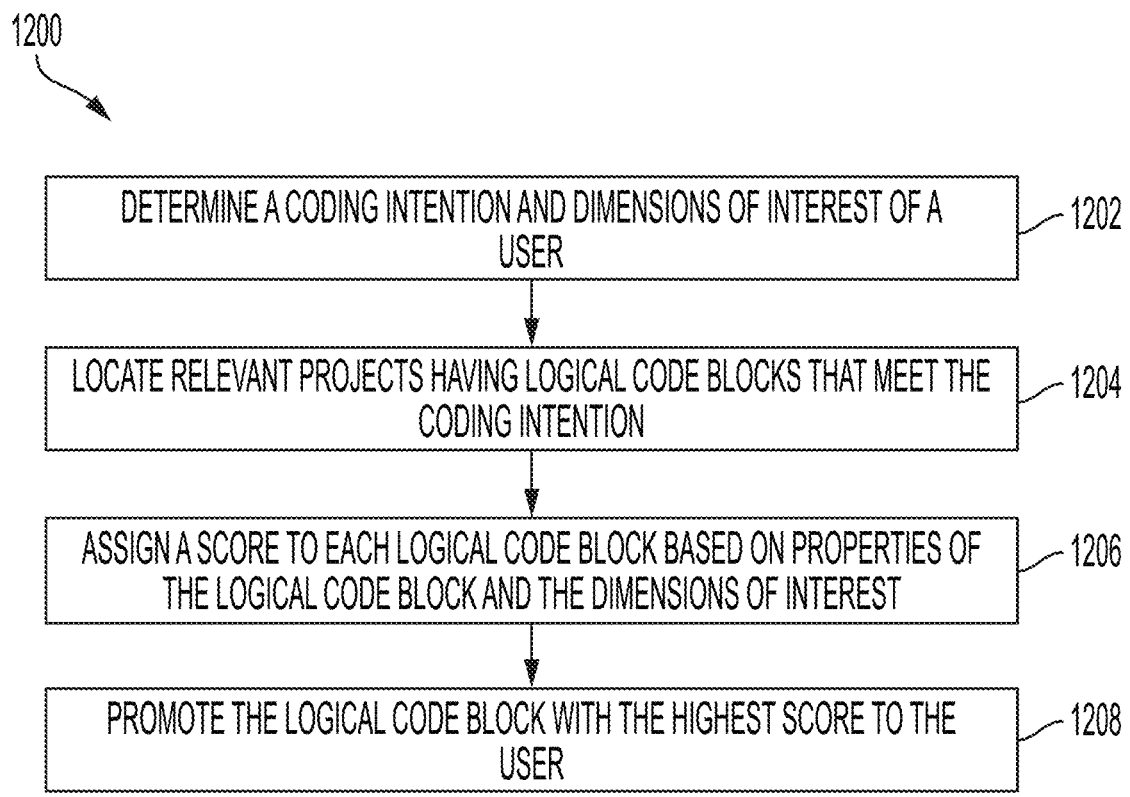
FIG. 12 depicts a flow diagram of a method for dynamic code snippet promotion according to one or more embodiments of the present invention.

Turning now to FIG. 12, a flow diagram of a method 1200 for dynamic code snippet promotion is generally shown in accordance with one or more embodiments of the present invention. All or a portion of the processing described in reference to the block diagram of FIG. 12 can be performed, for example, by computer system 1500 of FIG. 15 and/or by one or more of the cloud computing nodes 10 and/or cloud computing devices 54A-N of FIG. 13.

At block 1202, one or more coding intentions and one or more dimensions of interest to a user are determined. In according with one or more embodiments of the present invention, the coding intention includes keywords that indicate one or more functions to be performed by a target code snippet and one or more characteristics of the computing environment for executing the target code. The dimensions of interest can include one or more of stability, popularity, reusability, security, correlation, and scalability. In accordance with one or more embodiments of the present invention, the user can select two or more of these dimensions and assign a weight to each. In accordance with one or more embodiments of the present invention, user input and project context are received by the system and the coding intention is determined by applying NLP to the user input and the project context. The determined coding intention can be modified based on contents of a knowledge tree that was constructed based on contents of at least a subset of the repositories that will be searched for the target code snippet.

At block 1204 of FIG. 12, a plurality of relevant projects that each include a logical code block that meets the coding intention are located by searching a plurality of code repositories using the determined coding intention (e.g., the keywords). At block 1206, a score is assigned to each of the plurality of logical code blocks. The assigned score is based at least in part on properties associated with the logical code blocks and on the dimension(s) of interest to the user. At block 1208, a logical code block with a highest assigned score from the plurality of logical code blocks is promoted, or suggested, to the user via user interface. In one or more embodiments of the present invention, two or more of the high (or highest) scoring logical code blocks are promoted to the user. In accordance with one or more embodiments of the present invention, one or more additional logical code blocks that are related to the promoted logical code block are promoted to the user.

The process flow diagram of FIG. 12 is not intended to indicate that the operations are to be executed in any particular order, or that all of the operations shown in FIG. 12 are to be included in every case. Additionally, the processing shown in FIG. 12 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
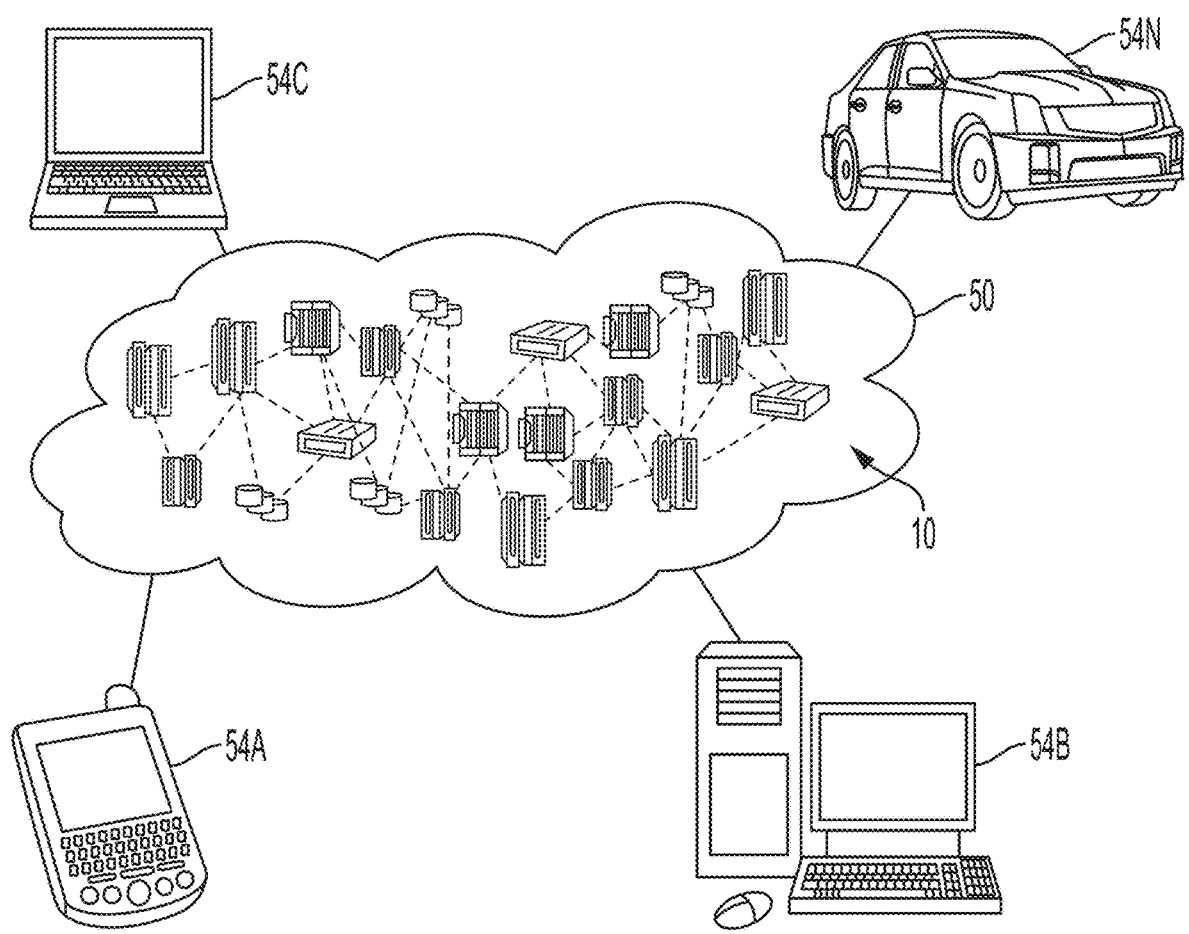
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
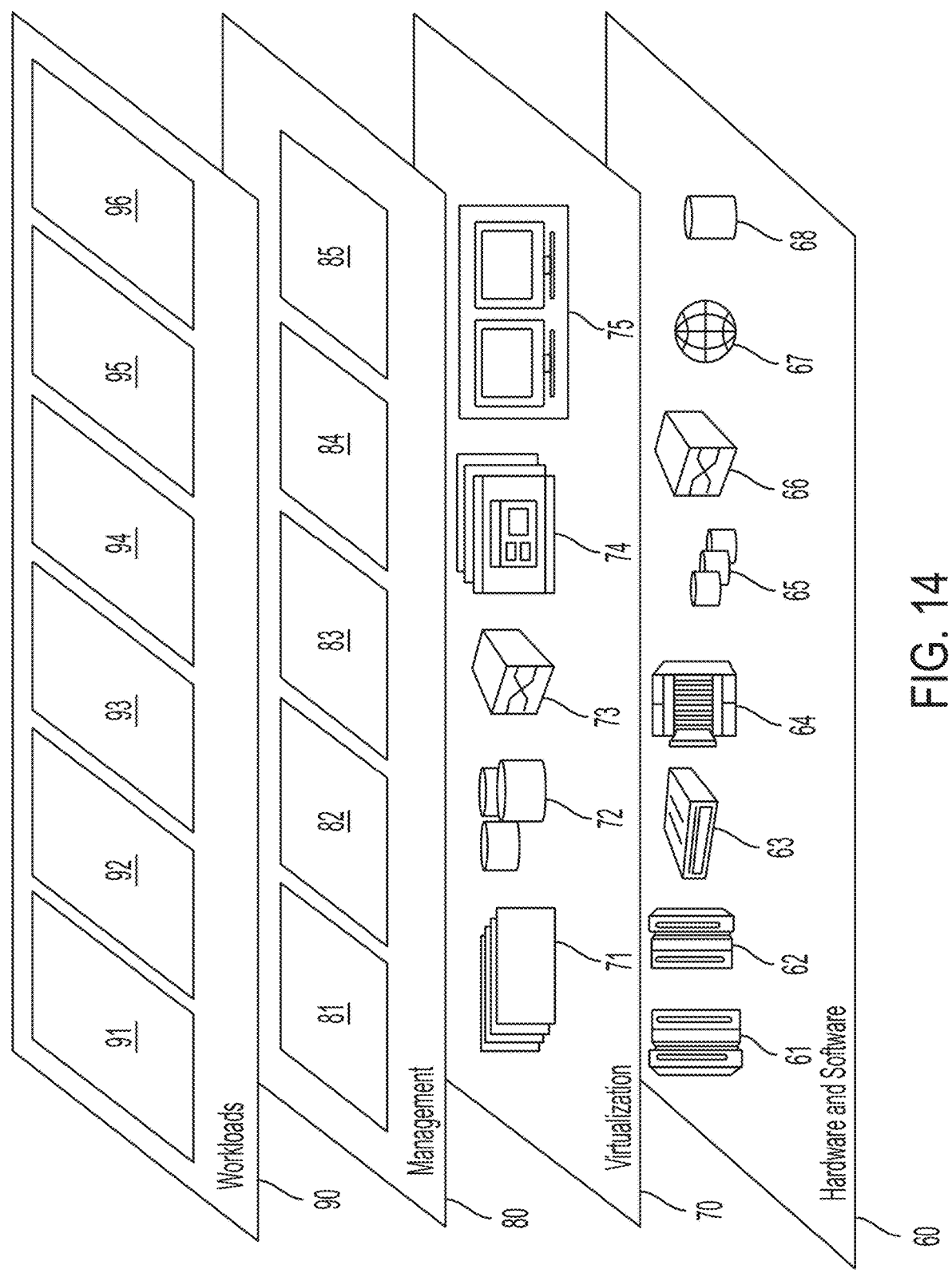
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 15:
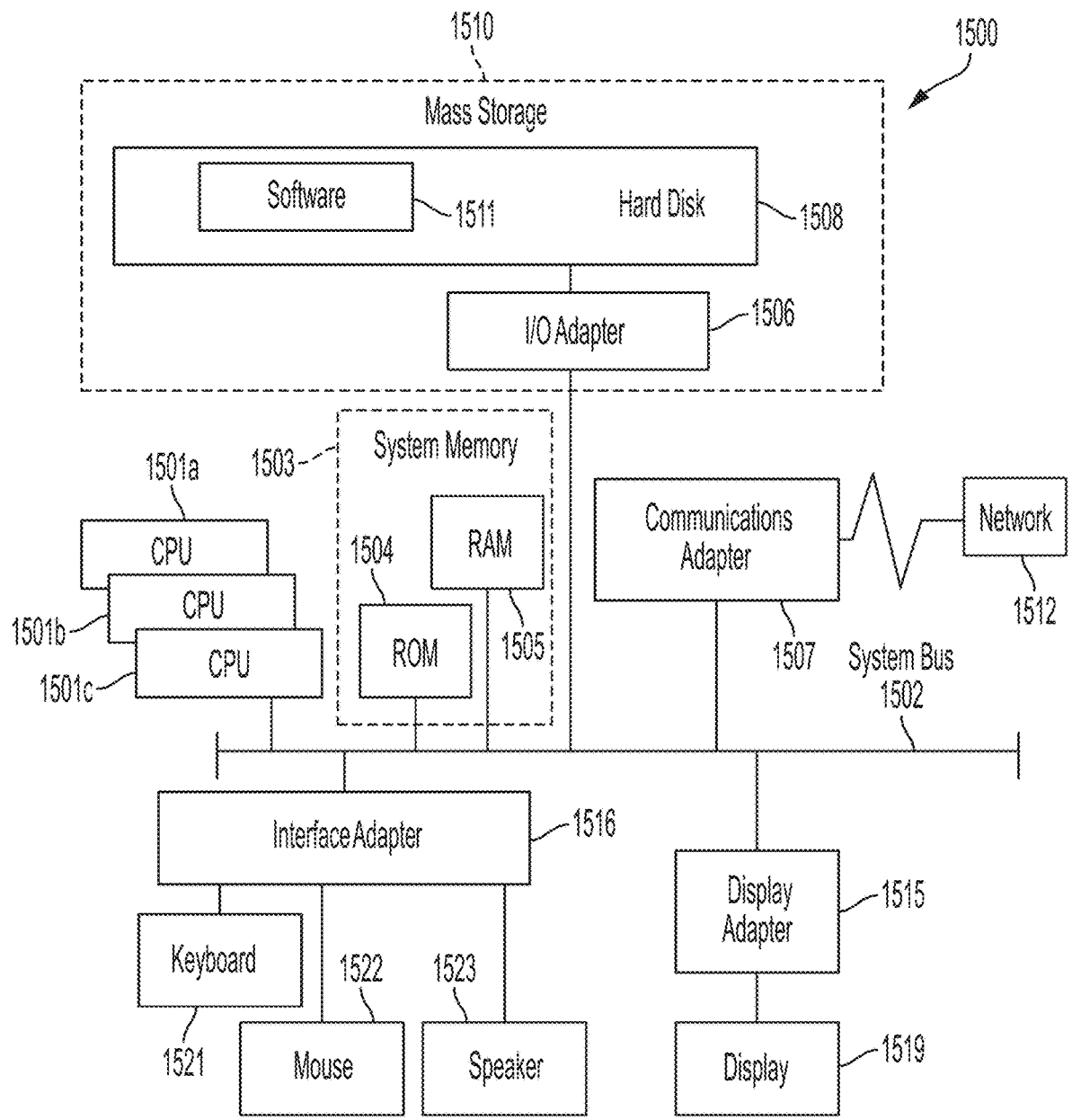
FIG. 15 illustrates a system for dynamic code snippet promotion according to one or more embodiments of the present invention.

Turning now to FIG. 15, a computer system 1500 is generally shown in accordance with an embodiment. All or a portion of the computer system 1500 shown in FIG. 15 can be implemented by one or more cloud computing nodes 10 and/or computing devices 54A-N of FIG. 13. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a serial advanced technology attachment (SATA) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS® or AIX® operating system, to coordinate the functions of the various components shown in FIG. 15.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 15, the computer system 1500 includes processing capability in the form of the processors 1501, and storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 15 is not intended to indicate that the computer system 1500 is to include all of the components shown in FIG. 15. Rather, the computer system 1500 can include any appropriate fewer or additional components not illustrated in FIG. 15 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   determining, by a processor, a coding intention and a dimension of interest to a user;
   locating, by the processor, a plurality of relevant projects that each include a logical code block that meets the coding intention, the locating comprising searching a plurality of code repositories based at least in part on the coding intention;
   assigning, by the processor, a score to each of the plurality of logical code blocks based at least in part on properties associated with the logical code blocks and on the dimension of interest to the user; and
   promoting to the user, by the processor, a logical code block with a highest assigned score from the plurality of logical code blocks,
   wherein the coding intention comprises a plurality of keywords that indicate a function to be performed and a characteristic of a computer environment where the logical code block will be used,
   wherein the characteristic of a computer environment where the logical code block will be used includes an operating system of the computer environment and a type of database used in the computer environment.

2. The method of claim 1, further comprising suggesting an other logical code block included in one of the plurality of relevant projects to the user, the other logical code block not one of the each of the logical code blocks that meets the coding intention.

3. The method of claim 2, wherein the other logical code block is selected from a group of additional logical code blocks in the plurality of relevant projects that are related to each other and to the coding intention.

4. The method of claim 1, further comprising receiving user input and project context, wherein the determining the coding intention comprises applying natural language processing (NLP) to the user input and the project context.

5. The method of claim 4, wherein the determining further comprises modifying the coding intention based on contents of a knowledge tree that was constructed based on contents of at least a subset of the repositories.

6. The method of claim 1, wherein the dimension of interest is selected from the group consisting of stability, popularity, reusability, security, correlation, and scalability.

7. The method of claim 1, wherein a plurality of dimensions of interest including the dimension of interest are determined and input to the assigning.

8. The method of claim 1, wherein at least one of the logical code blocks includes a code block that meets the coding intention and one or more additional code blocks that the code block is dependent on for execution.

9. The method of claim 1, wherein at least one additional logical code block from the plurality of logical blocks is promoted to the user.

10. A system comprising:
    one or more processors for executing computer-readable instructions, the computer-readable instructions controlling the one or more processors to perform operations comprising:
    determining a coding intention and a dimension of interest to a user;
    locating a plurality of relevant projects that each include a logical code block that meets the coding intention, the locating comprising searching a plurality of code repositories based at least in part on the coding intention;
    assigning a score to each of the plurality of logical code blocks based at least in part on properties associated with the logical code blocks and on the dimension of interest to the user; and
    promoting to the user a logical code block with a highest assigned score from the plurality of logical code blocks,
    wherein the coding intention comprises a plurality of keywords that indicate a function to be performed and a characteristic of a computer environment where the logical code block will be used,
    wherein the characteristic of a computer environment where the logical code block will be used includes an operating system of the computer environment and a type of database used in the computer environment.

11. The system of claim 9, wherein the operations further comprise suggesting an other logical code block included in one of the plurality of relevant projects to the user, the other logical code block not one of the each of the logical code blocks that meets the coding intention.

12. The system of claim 11, wherein the other logical code block is selected from a group of additional logical code blocks in the plurality of relevant projects that are related to each other and to the coding intention.

13. The system of claim 9, wherein the operations further comprise receiving user input and project context, wherein the determining the coding intention comprises applying natural language processing (NLP) to the user input and the project context.

14. The system of claim 13, wherein the determining further comprises modifying the coding intention based on contents of a knowledge tree that was constructed based on contents of at least a subset of the repositories.

15. The system of claim 9, wherein the dimension of interest is selected from the group consisting of stability, popularity, reusability, security, correlation, and scalability.

16. The system of claim 9, wherein at least one of the logical code blocks includes a code block that meets the coding intention and one or more additional code blocks that the code block is dependent on for execution.

17. A computer program product comprising a computer-readable storage medium having program instructions embodied therewith, the program instructions executable by one or more processors to cause the one or more processors to perform operations comprising:

determining a coding intention and a dimension of interest to a user;

locating a plurality of relevant projects that each include a logical code block that meets the coding intention, the locating comprising searching a plurality of code repositories based at least in part on the coding intention;

assigning a score to each of the plurality of logical code blocks based at least in part on properties associated with the logical code blocks and on the dimension of interest to the user; and promoting to the user a logical code block with a highest assigned score from the plurality of logical code blocks, wherein the coding intention comprises a plurality of keywords that indicate a function to be performed and a characteristic of a computer environment where the logical code block will be used, wherein the characteristic of a computer environment where the logical code block will be used includes an operating system of the computer environment and a type of database used in the computer environment.

18. The computer program product of claim 17, wherein the operations further comprise suggesting an other logical code block included in one of the plurality of relevant projects to the user, the other logical code block not one of the each of the logical code blocks that meets the coding intention.

* * * * *